United States Patent [19]

Groeger

[11] Patent Number: 5,779,847
[45] Date of Patent: Jul. 14, 1998

[54] PROCESS FOR HIGH PERFORMANCE, PERMEABLE FIBROUS STRUCTURE

[75] Inventor: H. Gunter Groeger, Charlotte, N.C.

[73] Assignee: Hoechst Celanese Corporation, Somerville, N.J.

[21] Appl. No.: 636,102

[22] Filed: Apr. 22, 1996

[51] Int. Cl.$^6$ .................................................. B32B 31/20
[52] U.S. Cl. .................. 156/308.2; 156/311; 427/244; 427/180; 427/185; 442/417
[58] Field of Search ................................. 427/244, 180, 427/185, 346, 366; 442/417; 428/176, 181; 156/296, 308.2, 311

[56] References Cited

U.S. PATENT DOCUMENTS

| | | |
|---|---|---|
| 4,118,531 | 10/1978 | Hauser . |
| 4,433,024 | 2/1984 | Eian . |
| 4,551,378 | 11/1985 | Carey, Jr. . |
| 5,328,758 | 7/1994 | Markell et al. . |
| 5,580,459 | 12/1996 | Powers et al. ............ 210/634 |
| 5,582,865 | 12/1996 | Rezuke et al. . |
| 5,605,746 | 2/1997 | Groeger et al. . |
| 5,626,820 | 5/1997 | Kinkead et al. . |

FOREIGN PATENT DOCUMENTS

| | | |
|---|---|---|
| 9411556 | 5/1994 | WIPO . |
| 9519828 | 7/1995 | WIPO . |

*Primary Examiner*—Marion E. McCamish
*Assistant Examiner*—Elizabeth M. Cole
*Attorney, Agent, or Firm*—Timothy R. Kroboth

[57] ABSTRACT

A novel, high performance yet permeable, tough, fibrous structure, and a process for making the structure are disclosed. The fibrous structure includes a stabilized microstructure of improved uniformity of fiber and particulate distribution. Beneficially, the fibrous structure is of improved structural integrity and stiffness, as a result of being reduced in thickness.

The process includes the steps of dry forming a fibrous web including crimped staple composite fibers, thereafter distributing and entrapping the functional particles in the web, and thereafter heating the fibrous web to form a microstructure-stabilized fibrous web. According to the process, the microstructure-stabilized fibrous web is thereafter by an additional heat treating step carried out without application of pressure to the web, heated to a thermoforming temperature, and thereafter the heated web is reduced in thickness and yet microstructural relative geometry is maintained. IR heat may be used. A nip gap is advantageously used to reduce the heated web in thickness.

14 Claims, No Drawings

PROCESS FOR HIGH PERFORMANCE, PERMEABLE FIBROUS STRUCTURE

FIELD OF THE INVENTION

This invention relates to a fibrous structure containing functional particulate.

BACKGROUND OF THE INVENTION

Functional particulate may be incorporated into a fibrous structure for a variety of reasons. For example, chemical defense fabrics for military personnel may contain vapor sorptive particles such as activated carbon. Filter media or filters may include sorptive particles for selectively removing certain components of a liquid or gas passing through the filter. Functional particulate may be used to release an active or desirable agent into a fluid stream, and may be chemically or catalytically reactive with a fluid stream constituent.

Filtration media and filters made thereof containing active particulate to achieve a certain function, generally perform better when more of the functional particulate is provided. This is in conflict with the desire for low pressure drop by a media/filter, because higher loading of active particles generally leads to higher pressure drop.

As exemplified by U.S. Pat. No. 5,328,758 to Markell et al, fibrous structures loaded with particulate are known. Markell specifies permeability in terms of a Gurley time of at least two seconds, teaches that Gurley times are increased with increased calender roll pressure, and uses calendering or pressing to compress web thickness.

Despite advances in this art, a fibrous structure containing an improved loading of functional particulate and yet having an acceptable permeability, is needed. Particularly advantageous in a filter made from the fibrous structure, would be an improved ratio of media loading and thus functional particulate loading, to pressure drop.

SUMMARY OF THE INVENTION

In accordance with the present invention, a fibrous structure having an improved loading of functional particulate per unit volume (area×thickness) and yet that has an acceptable permeability, is advantageously based upon a fibrous matrix comprised of crimped composite fiber. In this regard, this invention is based upon the discovery that an improved uniformity of a fibrous matrix and of functional particulate immobilized therein may be achieved, and furthermore that a highly loaded, fibrous matrix can be increased in structural integrity and stiffened by being sized. By the term "sized" is meant, for purposes of this description, reduced in thickness.

In a beneficial application, it has been found that the tough, stiffer and thinner fibrous structure is pleatable, and in pleated form remarkably maintains its stiffness under dynamic conditions so as to provide, within a specific volume of filter space, an improved ratio of media loading and accordingly functional particulate loading, to pressure drop.

In applications of this invention later detailed in the Examples, fibrous structures comprised of functional particulate-filled, fibrous matrices disposed between pre-formed partially pre-bonded webs are described. For clarity, in the remainder of this description, the term "macrostructure" is used to distinguish a functional particulate-filled, fibrous matrix or matrices, from a web such as a pre-formed partially pre-bonded web, which is not of relevance to the present invention. A consideration for purposes of understanding and clarity, is that a purpose and effect of sizing in accordance with the invention, is to significantly reduce macrostructure thickness and volume, whereas only minimal thickness and volume reduction take place in the case of, for instance, a pre-formed partially pre-bonded web under the conditions used.

Advantageously, in accordance with the present invention, a fibrous macrostructure includes a specific loading of at least 0.25 g/cm$^3$ of functional particulate, and yet has an air permeability greater than 100 l/cm$^2$/hr at 200 Pa. For purposes of this description, the term "specific loading" defines the normalized loading per unit volume of the macrostructure, and the term "normalized loading" is based upon the loaded mass and normalized apparent density of the particulate. For purposes of this description, specific loading values have been normalized to 0.5 g/cc apparent density. Beneficially, specific loading is used to define the loading of particulate in the available web volume, instead of, as has been customary, the percent of particulate relative to the percent of fibrous structure, because volume occupied by particulate and fiber determines permeability and tortuosity.

This fibrous macrostructure includes a stabilized microstructure comprised of a thermally bonded, generally uniform, fibrous matrix, and the functional particulate advantageously entrapped in interstices of the matrix so as to be generally equidistantly spaced in three dimensions, and secured to the matrix by adhesion, to form tortuous flow paths. In accordance with the invention, an improved degree of uniformity of the fibrous matrix and of the three-dimensional, equidistant spacing of the particulate, is advantageously present. Beneficially, the macrostructure has been sized, as a result of which it is tough and stiffened and has the specific loading and permeability described.

Beneficially, the fibrous matrix is formed from crimped composite fiber advantageously including a heat-softenable structural component and a lower melting component. Preferably, the crimped composite fiber is three-dimensionally crimped.

In making the highly loaded, fibrous macrostructure, the generally uniform, matrix or web is open for entrapment of functional particulate, and the particulate is advantageously entrapped in interstices of the matrix. The matrix is thermally bonded at the cross over points of individual fibers, and in addition, the lower melting, composite fiber component advantageously provides for adhesion of the particles to the fiber to secure the particles. Microstructure stabilization is beneficially effected by heat treatment without application of pressure.

After microstructure stabilization, the macrostructure is heated and sized. Relative spacing relationships within the microstructure are not changed by the sizing, and therefore improved uniformity of the fibrous matrix and of the functional particulate immobilized therein is maintained. In addition, the sizing beneficially increases structural integrity and as a result yields a tough macrostructure, increases stiffness, and increases tortuosity. Although sizing reduces permeability, permeability of the sized macrostructure is nevertheless as previously specified.

This novel, highly loaded, permeable, tough macrostructure cannot be initially made in this final form. Rather, openness of the web structure is initially needed for uniformity of particulate distribution and entrapment, and formation of tortuous flow paths.

DETAILED DESCRIPTION OF THE INVENTION

As indicated, the present invention is advantageously based upon a particulate-immobilizing, fibrous matrix comprised of crimped composite fiber including a structural component and a lower melting component. Beneficially, the structural component provides high structural integrity even when highly loaded with functional particulate, and the lower melting component provides for self-bonding of the fibrous matrix and has high bonding capability for adhesion of the particulate to the composite fiber.

Polyesters such as polyethylene terephthalate, which has a melting point of from about 240° to 256° C., are particularly useful as the structural component of a suitable composite fiber. However, other thermoplastic polymers or heat-softenable materials melting at a substantially higher temperature than the lower melting component, may be used. Generally speaking, a useful structural component melts at a temperature preferably at least about 30° to 50° C. higher than the lower melting component. The lower melting component is typically selected to optimize melt-adhesion of functional particulate to the composite fiber, and fiber-to-fiber bonding. A suitable composite fiber may consist of a third thermoplastic component distinct from the structural component and the lower melting component.

Beneficially, the lower melting component has a sharp or defined melting point of less than about twenty degrees centigrade, for particulate-to-fiber bonding. Illustrative thermoplastic polymers having a sharp melting point include polyamides and polyesters, in particular homopolymers. The sharper or more defined the melting point, the more highly controllable fiber-to-fiber bonding and particulate-to-fiber bonding tend to be. In determining whether a polymeric material has a sharp melting point, the melting point should generally be considered to begin when the material becomes soft and tacky, and to end when the material is totally liquid. Lack of adequate controllability of the melt and freeze cycle would be detrimental.

Moreover, a suitable lower melting component beneficially has adequate melt flow for flowing onto and into the dissimilar surface of the functional particulate, forming strong physical bonding, and yet has melt viscosity sufficient to preclude dripping or undesirable coating of the particulate. The extent of coating of the particulate also depends upon the particulate size and fiber denier. The highly efficient bonding provided by the lower melting component, preferably covers only an estimated one percent of the particulate surface, and as such, does not significantly reduce the performance of the particulate.

Preferred lower melting components include polyamides such as nylon-11 and nylon-12. However, other polymeric materials including polyolefins such as polyethylene, and modified polyesters have now been found to be useful, using improved process controls.

Concentric sheath-core fibers are one example of composite fibers useful in the practice of the invention. Suitable composite fibers also include eccentric sheath-core fibers, and fibers having a side-by-side configuration. Composite fibers of these types are known as bicomponent or heterofil fibers. Advantageously, a spun, heterofil fiber may be used.

The denier of the composite fiber may vary depending upon the desired properties of the fibrous matrix. Useful composite fiber is typically macrofiber having an average diameter in excess of about 10 microns. A typical average diameter for a useful macrofiber may be about 12 to 25 microns depending upon the intended application. If desired, fine denier composite fibers, such as those having an average dtex of 0.5 to 3, in particular 0.8 dtex, may be used, in place of macrofiber, to form the fibrous matrix and thus produce a strong, yet softer structure.

The immobilizing matrix may also include non-composite fibers or other substances. Immobilizing matrices intended for use in filters, may advantageously include structural fibers having a dtex of from 6 to 10,000 to provide stiffness, especially if large functional particulate is used, and also may advantageously include microdenier fibers for effective filtration of dust particulate. Microdenier fibers or stiffening fibers may be composite or non-composite fibers, or a blend thereof. Fibrous structures including functional particulate, can be built to thicknesses of from 0.5 to 50 mm or more.

A particulate-entrapping, fibrous structure in accordance with the present invention, is beneficially dry formed by carding. Dry forming is advantageous in forming a generally uniform structure, and advantageously provides for controlled introduction, spacing and entrapment of dissimilar matter such as functional particulate, with tortuous paths in the particulate-loaded structure for air or fluid flow.

Advantageously, a non-woven, fibrous matrix in accordance with the invention, is formed from crimped composite staple fibers so as to be somewhat lofty for enhancing entrapment of functional particles. Two- or three-dimensional, crimped fibers are beneficially used. In such case, the composite fibers should be so distributed and present in a sufficient amount to form a three dimensional, generally uniform structure that entraps functional particles, provides for melt-adhesion of the particulate to the structure, and beneficially provides for binding of particles to the structure at more than one point. Consistent with a high particulate loading in accordance with the present invention, the composite fibers are present in a minor amount compared to the amount of the particulate. Accordingly, it is generally preferable that only about 5-20 wt. % of a particulate-loaded macrostructure, be fiber. As noted, the structural component of the composite fiber beneficially provides high structural integrity so as to make possible a high loading of the particulate. Binding of the particles to the structure at more than one point increases structural integrity.

In accordance with the present invention, an improved specific loading-permeability is attained through an improved degree of general uniformity of the matrix fiber and an improved degree of generally equidistant spacing of the functional particulate within the three dimensional space of the fibrous matrix. Advantageously, as a result of the improved general uniformity of the fibrous matrix and the particulate, a relatively greater volume of the fibrous matrix is occupied by the particulate, or provides for tortuous flow and yet acceptable permeability. Moreover, improvement is obtained of the ratio of that volume occupied by the particulate and that volume available for flow, with increased tortuosity. The increased tortuous nature of flow advantageously effects higher interaction between a gas/liquid and the functional particulate, so as to effect more efficient kinetics by the functional particulate under dynamic conditions.

Also significant in attaining an improved specific loading-permeability in accordance with the present invention, is that, after microstructure stabilization, the macrostructure be sized and set into a thinner structure so as to reduce the macrostructure volume, but in such a manner as to not change relative microstructural spacing relationships, whereby improved general uniformity of the matrix structure and three-dimensional, generally equidistant spacing of the particulate, and acceptable permeability are maintained.

Beneficially, a high performance, permeable, tough fibrous macrostructure in accordance with the present invention includes a specific loading of at least 0.25 g/cm³ of functional particulate, preferably about 0.30 to 0.35 g/cm³ or more, and yet has an air permeability greater than 100 l/cm²/hr, preferably about 175 to 200 l/cm²/hr or more, at 200 Pa. As previously indicated, the desire for a relatively higher specific loading is in conflict with a relatively greater permeability. Thus, a higher specific loading generally leads to a lower permeability. Beneficially, as mentioned, specific loading is used to define the loading of particulate in the available web volume, because volume occupied by particulate and fiber determines permeability and tortuosity.

For purposes of this description, specific loading values have been normalized to 0.5 g/cc apparent density of the functional particulate. However, an appropriate normalization value will depend upon the type of functional particle under consideration. Normalization is necessary because different types of particles have different apparent densities.

Beneficially, after being sized and set, the relatively thin, yet highly loaded and acceptably permeable, and stiffer fibrous structure may be pleated to form sharp, V-shaped pleats, which when constructed into a filter, produces a filter remarkably characterized by low pressure drop. In addition, pleatability into sharp, V-shaped pleats allows for improvement in the number of pleats per unit length, with reduction in the space between pleats, thereby filling the volume of the filter, and hence resulting in an improved ratio of media loading and hence particulate loading, to pressure drop. As may be understood, when making a pleated filter, it is an objective to attain the theoretical balance point of highest functional particulate loading and lowest pressure drop. In the present invention, this balance point is approached as a result of factors including improved particulate loading, and web stiffness and thinness.

Although after being sized and set, the fibrous structure is stiff, it is nevertheless tough because of improved structural integrity, and as a result, can be pleated on common pleating machinery without cracking or damage. Ductility and flexibility of the structure, in addition, provide for robustness against mechanical abuse during processing and in its end-use. The stiff structure beneficially retains a straight surface even at high air velocity, enabling tight pleat spacing when used in pleated form, and fewer pleat spacers than customary for similar products. The stiff structure also advantageously assists in uniformity of the pleating. Due to the thermoplastic nature of the fibers, the structure can be heat set after forming, such as heat-setting of pleats for pleated filters or heat-setting of molded parts.

Factors influencing the degree of general uniformity of the matrix fiber and of three dimensional, equidistant spacing of functional particulate within the fibrous matrix include fiber denier, cut length, and type and amount of crimp; web openness, mass, loft and the structure of the interstitial space between the fibers; particulate physical characteristics including size, geometric shape, density, surface characteristics, and porosity; and the dynamics of the web-forming process, particulate addition, and web agitation. As certain of these factors have been described in some detail in the prior art, no discussion except for a few comments is given here, for sake of brevity. Thus, for instance, although finer fiber provides more fiber surface than coarser fiber and can therefore be used to increase the available surface area for a given fiber weight, countervailing considerations may dictate an opposite selection. Significance of dynamics of the web-forming process is discussed in U.S. Pat. No. 5,486,410 to Groeger et al. Also, it is important that the particulate physical characteristics correlate with the size and geometry of the particulate-entrapping, interstitial spaces of the web. Furthermore, the division of a given amount of particulate into two or more quantities, and addition in this way to the web, rather than a single addition of the particulate, is typically preferable. Moreover, during particulate addition, mechanical or other suitable agitation of the web, or use of an inclined ramp or some other technique to promote vertical and lateral distribution will typically promote uniformity of the particulate distribution.

A factor particularly significant in the present invention, in attaining an improved degree of general uniformity of the matrix fiber and of the functional particulate within the three dimensional space within the fibrous matrix, is the fiber crimp. It has been found that although two-dimensional fiber crimp is beneficial, that three-dimensional fiber crimp is typically significantly better. This improvement is believed to be due in part to improved uniformity in the third dimension. Moreover, for a three-dimensionally, crimped fiber, a relatively higher percentage of crimp is better for purposes of this invention. For instance, about 30% or more crimp has been found to be highly beneficial. Also important in obtaining improved general uniformity is the line speed during particulate addition. Too fast a line speed may reduce uniformity. In addition, mechanical agitation of the web between the particulate addition and microstructure stabilization, to provide lateral and vertical movement of particulate, is beneficial. Further details may be understood from the Examples.

By the invention, an improved degree of equidistant spacing of the functional particulate within the three dimensional space of the fibrous matrix, from surface-to-surface of the structure, has been demonstrated. Also, two or more types of particulate in layers or blends, even intimate blends, within the fibrous structure, may be added. Accordingly, in a variation in accordance with the present invention, two or more different types of particulate may be distributed and entrapped within a fibrous web, with first one type of particulate being added, then a second type and so forth, so as to form a layer of each particulate within the web, with the sequence of the layering dependent upon the order of addition. Each such particulate layer is beneficially characterized in accordance with the present invention, by three-dimensional, equidistant spacing of the particulate.

As indicated, functional particulate may be added in single or multiple applications. Generally speaking, a relatively less dense web is better suited for a single, but not heavy application, of particulate. Also, the speed of particulate addition is important. Thus, greater uniformity generally results from relatively slower addition.

Once generally equidistant, three-dimensional spacing of particulate within the web matrix has been attained in accordance with the present invention, the microstructure is stabilized by advantageously melt-adhering particulate to the web matrix to secure the particulate, and by thermally bonding the web at the cross over points of individual fibers. The resulting fiber-to-fiber bonds are generally stronger than the composite fibers themselves, and the particulate-to-fiber bonding likewise strengthens the structure.

Microstructure stabilization is beneficially achieved by heating the particulate-loaded matrix to an elevated temperature above, typically slightly above, the melting point of the lower melting fiber component to controllably melt the lower melting component so as to efficiently bond particulate to the fibers without substantially deleteriously affecting particulate surface area, and to self-bond the fibrous structure. A useful elevated temperature is significantly less than the melting point of the structural component, and heat is applied for a suitable period of time to achieve the desired bonding. Selection of a relatively higher heat treatment temperature generally requires a relatively shorter exposure time, whereas selection of a relatively lower temperature usually requires a relatively longer exposure time. Treatment conditions that may result in too much flow of the lower melting component or in structural degradation, are to be avoided.

The heat treatment is advantageously without application of pressure. A highly suitable manner of carrying out the microstructure stabilization is to pass the loaded web through an IR oven, especially when the functional particulate has a significantly lower specific heat than the lower melting component. Microstructure stabilization beneficially permits a subsequent reduction in the macrostructure thickness without distortion of relative geometrical dimensions or relationships. Accordingly, in accordance with the invention, there is produced a stabilized, permeable microstructure characterized by increased uniformity of the fibrous structure, an improved degree of generally equidistant, three-dimensional spacing of particulate within the fibrous structure, and tortuous flow paths.

Thereafter, in accordance with the invention, macrostructural dimensions, in particular, thickness, can be beneficially changed and yet relative geometrical relationships of the microstructure, such as the relative distances between particles, are maintained. It has been advantageously found that a highly loaded, fibrous macrostructure in accordance with the invention, can be increased in structural integrity, made thinner, and stiffened, and yet acceptable permeability maintained. By comparison, a highly loaded structure with non-uniform particulate distribution, cannot be made with structural integrity or thin or stiff, and yet acceptable permeability maintained; non-uniformity of particulate distribution results in problems including fiber displacement and hence is contrary to fibrous structure uniformity. Accordingly, in accordance with the invention, a highly loaded, fibrous macrostructure having a stabilized microstructure, is subjected to heating and sizing to produce a tough, stiffer and thinner structure compared to an un-sized structure of the same loading of particulate and fiber, whereby the macrostructure is reduced in volume and yet acceptable permeability is maintained.

This result is achieved by heating to an elevated temperature significantly above the glass transition temperature of the composite fiber component having the higher or highest glass transition temperature, but below the melting point of the lower melting component, whereby the composite fiber is softened or otherwise suitably prepared for thermoforming. This thermoforming temperature is, of course, less than the elevated temperature used for microstructure stabilization so as not to destabilize the microstructure, and the heat is applied for a suitable period of time to achieve the desired effect. This heat treatment step may be conveniently carried out using an IR oven. Selection of a relatively higher heat treatment temperature generally requires a relatively shorter exposure time, whereas selection of a relatively lower temperature typically requires a relatively longer exposure time. Treatment conditions that may result in destabilization of the microstructure are to be avoided.

Sizing of the suitably heated, fibrous structure is advantageously effected using an appropriate nip gap. Thus, for a specific loading of 0.25 g/cm³ or more of functional particulate, too small a nip gap relative to the macrostructure thickness crushes the macrostructure and destroys structural integrity. As a result, fiber-fiber bonding is disrupted, as well as fiber-particulate bonding, and the fibrous macrostructure does not hold together at all. On the other hand, too large a nip gap will not result in a beneficially tough and stiffened, fibrous macrostructure in accordance with the present invention. However, nip gap is not as significant for fibrous structures with lower loading of particulate. Thus, for a specific loading of about 0.20 g/cm³ or less of particulate, a relatively wider range of useful nip gaps exists for yielding suitable product. Therefore, an appropriate nip gap for use in the present invention, is effective for making a highly loaded macrostructure of improved integrity and increased stiffness, and yet having acceptable permeability. In addition, because relative spacing relationships within the microstructure are not changed, improved general uniformity of the fibrous matrix and particulate distributed therein are maintained. Increased tortuosity of flow paths also results. Further details as to nip gap selection may be understood from the Examples.

By comparison, it is a particular object of Markell to attain structural integrity by compressing a particulate-filled, fibrous structure, as opposed to maintaining acceptable permeability. A fibrous web in accordance with the teachings of the Markell patent would have a permeability of about 20 l/cm²/hr or less at 200 Pa as a result of the calendering or compressing.

A merely higher loaded web is not an object of the present invention. A high loading based upon greater thickness, will not yield an improved ratio of media loading to pressure drop, when the media is made into a pleated filter.

Also important in obtaining a tough, stiffer and thinner, fibrous media is appropriate cooling after the sizing step. For a specific loading of 0.25 g/cm³ or more, rapid cooling and hence a rapid thermal set are beneficial. More cooling energy and forced cooling especially benefit rapid thermal setting. Forced cooling will typically improve the set, as well as the reproducibility of the thermal set, although ambient air cooling may be sufficient in some cases if the ambient air temperature is low enough to provide rapid cooling.

Improved stiffness of the set fibrous macrostructure is, as indicated, attained by improved general uniformity of the fiber and particulate. In addition, selection of the composite fiber is important, and in this regard, the particular lower melting and structural components, and the fiber denier. These components are preferably selected to provide efficient bonding of fiber-to-fiber and fiber-to-particulate, and efficient thermoforming and thermal setting. Relatively higher fiber denier provides for relatively more stiffness, whereas relatively lower fiber denier provides for comparatively less stiffness. Also, of importance are the structural arrangement of the fiber and particulate, and the distance between bond points of fiber-to-fiber bonds and particulate-to-fiber bonds. Preferably, each fiber and particulate are bonded several times. Closer bond points result in a stiffer web, whereas more distant bond points result in a less stiff web. Increased general uniformity leads to closer, but more evenly spaced, bond points.

Functional particulate may be selected from a wide variety of substances having a function that is desirably incorporated into a fibrous structure. Beneficially, the functional particulate has a significantly lower specific heat than the lower melting fiber component and so heats quickly to produce localized fluidity of the lower melting fiber component, and hence excellent structural integrity. Activated carbon particles and inorganic oxides and hydrates are characterized by significantly lower specific heat. Activated carbon is commonly used for removal of undesirable or hazardous gas.

Other types of functional particulate include silica, zeolite, molecular sieve, clay, alumina, sodium bicarbonate, ion exchange resin, catalytic agents including enzymatic agents, metal oxide, and biocidal, fungicidal, virucidal, air-freshening and perfuming particulate. Fungicidal particulate may be incorporated into a filter structure, such as for an automobile climate control system, to remove mildew and mildew odors from circulated air. The foregoing list is intended to be representative of the wide variety of functional particulate available, and not in limitation of the substances suitable for use in the practice of the present invention.

Functional particulate may range in size from about 1 micron or less to about 3 to 5 mm or more in average diameter, and may vary in shape from, for example, regularly shaped, spheroidal beads and cylinders to irregularly shaped particles or granules. However, as mentioned, the particulate beneficially has suitable physical characteristics including an appropriate size, to be entrapped by the web structure. Activated carbon particles of about 400 to 500 microns are highly suitable for entrapment in a generally uniform web made from fibers having an average diameter of about 15 microns. Reduction of size of void spaces will generally result from the addition of functional particulate; accordingly, larger size particulate may be entrapped first, and thereafter, smaller size particulate that would not be otherwise entrapped, may be added and entrapped.

Beneficially, as a result of high loading of functional particulate and increased tortuosity of flow paths, significant dust removal efficiency and dust holding capacity are present.

Also as a result of the improved general uniformity, improved uniformity in a multi-web fibrous structure may be achieved, and a unitary and apparently single layer, fibrous structure may be made. Multi-web, fibrous structures as illustrated in the Examples, are beneficially of improved unitary character, with the particulate being contained from below one web surface to below the opposite surface, which provides surfaces advantageously free of particulate. Interfacial bonding results from intermingling of fibers of contacting webs, which fibers upon the application of heat form fiber-to-fiber bonds to produce a unitary structure.

Multi-web, fibrous structures may be prepared which differ from web to web in specific loading or particulate (for instance, size or type) or fiber or otherwise as desired, but in any event, each such web will be generally uniform as to the matrix fiber and the particulate, in accordance with the present invention. Stacks of webs differing from one another, may be built which together provide for gradation in distribution of particulates. In addition, other arrangements may be made including one-sided structures, as well as lamination of a dissimilar material within or to a core structure made in accordance with the present invention.

Moreover, stacks of such multi-web, fibrous structures may be prepared. These stacks may be used to make thick structures of high loading with acceptable permeability. These stacks may be pleated if desired, for construction into a filter, including personal protection filters. When pleated, the pressure drop of a relatively thinner stack in accordance with the present invention, will be less than the pressure drop of a relatively thicker stack, for reasons including interference of the additional structural thickness with flow.

A multi-web, fibrous structure in accordance with the present invention, may beneficially include one or more microfiber webs. These webs define flow passageways generally characterized by finer interstices or voids. The average pore size of a microfiber web may be adjusted by varying the level or diameter of microfiber; however, a useful microfiber web will typically be of appropriate porosity for effective removal of particulate of about 3 microns and less.

Advantageously, the microfiber web will be disposed within the multi-web, fibrous structure. Typically, for filtration applications, the microfiber web will be free of functional particulate, and the least amount of microfiber will be used as is consistent with obtaining the desired filtration efficiency.

The microfiber may, generally speaking, be any fiber of small diameter, typically less than 10 microns average diameter. It may be, for example, a polymeric microfiber or a mineral microfiber, or a mixture of types of microfiber. Particularly suitable microfiber for a filtration structure has an average diameter of about 5 microns or less, preferably about 1 to 3 microns, very preferably about 1 to 2 microns. Other fibrous materials including fibers of less than 1 micron, may be included in or on the structure. Microfibers of different diameters may be combined. Beneficially, melt blown, polymeric microfiber may be used.

Polymeric, unicomponent microfiber may be made of a polyester such a polybutylene terephthalate (PBT), which melts at a temperature substantially in excess of the processing temperatures used. The microfiber may be a functional fiber such as a vapor sorptive, carbon fiber. A carbon/polymeric microfiber blend or other suitable functional blend may be used.

Webs could be formed from different types of microfibers. One microfiber web could be made of a fiber suitable only for filtration, and another microfiber web could be a functional fiber such as vapor-sorptive, carbon fiber. Thus, a multi-web, fibrous structure could contain microfiber webs having different functions.

A multi-web, fibrous structure in accordance with the invention, may have in contact therewith one or more fabric layers. These fabric layers may be exterior to or disposed within the fibrous structure of the present invention. These fabric layers may be nonwovens including partially densified nonwovens, woven fabrics, knit fabrics, porous membranes and so forth. These fabric layers may be laminated to or otherwise suitably attached to the fibrous structure. These fabric layers may have a useful function such as water repellency and so forth.

Fibrous structures of this invention in combination with other materials, are useful for filters of all kinds, as adsorptive liners, and as a structural material for shoes, shelters, rooms, tents, vehicles and other applications. Heat molded parts are useful as face masks, hoods or other suitable applications. U.S. Pat. No. 3,971,373 to Braun illustrates a prior art, face mask having a cup-like shape that adapts it to fit over the mouth and nose. Likewise, enclosures such as tents or other shelters including the fibrous structures of this invention, may be made by heat molding or thermoforming.

Filter uses include cabin air filters suitable for automobiles, trucks, other vehicles, airplanes, submarines and so forth. Filter uses exist in heating, ventilation and air conditioning, and in residential air purifiers, clean room processing, food processing, smoking lounges, funeral homes and so forth. Uses include liquid filtration for preparing high purity water, and for color or byproduct removal in producing whisky, vinegar and so forth.

The fibrous structure may be used in various forms including pleated, tubes, pockets (as in pocket filters), blankets, rolls, bags, ducts such as air ducts, and ductliners. The fibrous structure may be used alone or stacked or in combination with other fabrics, filter media, films, plastics and membranes.

While most of the following Examples refer to gaseous filtration, usefulness also exists for liquid filtration, as well as for gas and liquid processing, and for the purposes earlier described. Unless otherwise stated in this description and these Examples, all processing is carried out at ambient temperature and pressure, and all percentages are weight/weight.

EXAMPLE 1

Two open webs of 3.2 dtex, 38 mm cut length, nylon sheath/polyester core heterofil staple fiber were formed by carding, on a pre-formed partially pre-bonded web of 1.6 dtex crimped, heterofil, staple fiber. The crimp of the open web fiber is three dimensional with 30 to 35% crimp, resulting in an improved degree of general uniformity of the matrix fiber. Each open web consists of 11 g/m² of fiber, and together the open webs are approximately 20 mm thick.

0.45 mm average diameter spherical activated carbon was distributed by gravity and entrapped within the two open webs to achieve the desired fiber-to-particulate weight ratio. Process conditions including a line speed of 23 m/min, particulate addition in two approximately equal applications, and mechanical agitation of the structure between the particulate addition and microstructure stabilization, including use of an inclined ramp to provide for lateral movement of the particulate, assist in achieving an improved degree of generally equidistant spacing of the particulate in three-dimensions within the fibrous matrix of each of the two webs. The particulate-loaded microstructure was stabilized and a unitary web structure was formed by heating to a temperature slightly above 185° C. in an IR oven to controllably melt the sheath polymer for efficiently bonding the particulate to the fibers and self-bonding the fibrous structure.

Then, the fibrous structure was pre-sized to a thickness of approximately 5 mm. Because of stabilization of the microstructure, pre-sizing was accomplished without distortion of the microstructure.

A like structure was formed in the same manner as the first one, and the first half was applied up-side-down on top of the second, which was still sufficiently hot to form a vertically symmetrical structure, with an improved degree of general uniformity of the matrix fiber and of three dimensional, equidistant spacing of immobilized particulate within the multi-web core (or macrostructure), and with an improved degree of unitary character. Then, the fibrous structure was heated in an IR oven to approximately 165° C. to soften the fiber for thermoforming; and the heated structure was passed through a nip gap of 1.52 mm to achieve the desired thickness, which was set by ambient air cooling. Air cooling was sufficient due to cold weather conditions. In this manner, the fibrous macrostructure was sized and set, thereby increasing the structural integrity and stiffness, and yet acceptable permeability was maintained. Because microstructural relative geometry was not changed, improved general uniformity was maintained. In addition, tortuosity of flow paths was increased.

The resulting multi-web, fibrous macrostructure was 1.65 mm thick with 631 g/m² activated carbon (equivalent volume is 1650 cm³), which is equal to a specific loading of 0.44 g/cm³ (the actual carbon loading was normalized to 734 g based upon 0.5 g/cc apparent density). The normalized loading is the loaded mass adjusted for the normalized apparent density. The specific loading of the media is, of course, less, as the media contains additional fibrous structure. The media had an air permeability of 251 l/cm²/hr at 200 Pa pressure drop, which is, of course, less than that of the fibrous macrostructure. The media also had excellent integrity and stiffness.

The media was pleated with 6.7 mm pleat spacing, the V-shaped pleats were heat set, and thereafter constructed into a 254×254×38 mm gas phase vehicle cabin air filter with 457 g of activated carbon in the filter and a pressure drop of 95 Pa at 6 kg/min air flow. Dynamic adsorption capacity for the filter was measured as 93.2 g of gas adsorbed when charged with 80 ppm toluene at a velocity of 0.77 m/sec.

In addition, the media is useful as a dust filter even though it contains no microfiber or like additive for dust filtration. Thus, the media would provide the benefit of adsorption in combination with a significant amount of dust removal.

COMPARATIVE EXAMPLE 1

A commercially available, prior art, like, sized and set, vertically symmetrical, unitary, multi-web, fibrous structure was made as in Example 1, using a different activated carbon. Other differences included a two-dimensionally crimped fiber, a higher line speed of 28 m/min, and no use of mechanical agitation or an inclined ramp. Compared to the fibrous structure of Example 1, this fibrous structure had a lessened degree of general uniformity of the matrix fiber and the particulate. As a consequence, it was not possible for this fibrous structure to have a high particulate loading as in Example 1. A further important difference was the use of a nip gap of 0.52 mm.

The multi-web, fibrous macrostructure was 1.62 mm thick with a loading of 344 g/m² activated carbon (equivalent volume is 1620 cm³), which is equal to a specific loading of 0.20 g/cm³ (the actual carbon loading was normalized to 331 g/m² based upon 0.5 g/cc apparent density). The media had a relatively greater air permeability of 417 l/cm²/hr at 200 Pa pressure drop, compared to Example 1, and had good integrity, and was unitary. Thus, a smaller nip gap was workable for a fibrous macrostructure of lower particulate loading; however, it is now known that a larger nip gap would have produced a stiffer structure. By comparison, the fibrous structure of Example 1 was stiffer and more unitary.

This media was pleated with 6.7 mm pleat spacing, the V-shaped pleats were heat set, and thereafter constructed into a 254×254×38 mm gas phase vehicle cabin air filter with 253 g of activated carbon in the filter and a pressure drop of 135 Pa at 6 kg/min air flow. Accordingly, the pressure drop of this pleated filter was greater (135 vs. 95 Pa) than that of Example 1, even though the carbon loading was significantly less than that of Example 1. The greater pressure drop is believed to be due to the lesser uniformity of the microstructure and to lesser stiffness. Dynamic adsorption capacity for the filter was measured as 42.2 g of gas adsorbed when charged with 80 ppm toluene at a velocity of 0.77 m/sec.

EXAMPLE 2

A stacked, fibrous structure consisting of three layers of the media of Example 1, was pleated with pleats spaced apart 16.8 mm, which were heat set, and constructed into a 357×244×65 mm gas phase vehicle cabin air filter with 990 g of activated carbon in the filter. The filter was found to have a pressure drop of 320 Pa at 8.5 m³/min air flow. Dynamic adsorption capacity for the filter was tested against acetaldehyde vapor at a velocity of 0.62 m/sec and found to be excellent.

EXAMPLE 3

Two open webs of 3.6 dtex, 38 mm cut length, polyethylene sheath/polyester core heterofil staple fiber were formed by carding, on a pre-formed partially pre-bonded web of 1.2 dtex crimped, heterofil, staple fiber. The crimp of the fibers is two dimensional. Each open web consists of 15 g/m$^2$ of fiber, and together the open webs are approximately 20 mm thick.

30×50 mesh granular activated carbon was distributed by gravity and entrapped within the two open webs to achieve the desired fiber-to-particulate weight ratio. Like process conditions as in Example 1, were used to achieve an improved degree of generally equidistant spacing of the particulate in three-dimensions within the fibrous matrix of each of the two webs, in accordance with the present invention. The particulate-loaded microstructure was stabilized and a unitary multi-web structure was formed in like manner as Example 1, and then the multi-web structure was pre-sized.

A like structure was formed in the same manner as the first one, thereafter another two webs were formed on top of this using like amounts of fiber and activated carbon as before, and then the first multi-web structure was applied up-side-down on top of the second. The newly formed, two webs were still sufficiently hot to form a vertically symmetrical structure having an improved degree of general uniformity and of three dimensional, equidistant spacing of immobilized particulate within the macrostructure, and with an improved degree of unitary character.

Then, the multi-web structure was heated in preparation for sizing as in Example 1, sized using a nip gap of 2.03 mm, and due to increased thickness and other considerations, actively cooled. The resulting fibrous macrostructure was 2.56 mm thick, with a loading of 717 g/m$^2$ activated carbon (equivalent volume is 2560 cm$^3$), which is equal to a specific loading of 0.37 g/cm$^3$ (the actual carbon loading was normalized to 943 g/m$^2$ based upon 0.5 g/cc apparent density). Compared to Example 1, this macrostructure had a lower specific loading, which is attributed in part to use of two dimensionally crimped fiber. The media had an air permeability of 253 l/cm$^2$/hr at 200 Pa pressure drop, and very good integrity and stiffness.

The media was pleated with 16.5 mm pleat spacing and constructed into a 610×610×140 mm gas phase filter with 4480 g of activated carbon in the filter and a pressure drop of 100 Pa at 57 m$^3$/min air flow. Dynamic adsorption capacity for the filter was measured as 117.2 g of gas adsorbed when charged with 400 ppb H$_2$S at a velocity of 2.54 m/sec. The filter is useful for the removal of gaseous components and nuisance particles >0.5 µm in indoor air systems, portable or stationary air handling units or smoke and odor removal hoods.

EXAMPLE 4

A like, sized and set, vertically symmetrical, unitary, multi-web, fibrous media was made as in Example 1. However, a different particulate (0.5 mm average diameter spherical zeolite) was used. The fibrous macrostructure was 1.72 mm thick with a loading of 907 g/m$^2$ zeolite (equivalent volume is 1720 cm$^3$), which is equal to a specific loading of 0.35 g/cm$^3$ (the actual zeolite loading was normalized to 597 g based upon 0.5 g/cc apparent density). The media had an air permeability of 382 l/cm$^2$/hr at 200 Pa, and excellent integrity and stiffness.

The media was pleated with 6.7 mm pleat spacing and constructed into a 140×140×44 mm desiccant filter with 227 g of zeolite in the filter and a pressure drop of 96 Pa at 1.5 m$^3$/min air flow. The filter had excellent swing capacity for adsorption and desorption of water vapor.

EXAMPLE 5

A stacked, fibrous structure consisting of three layers of the media of Example 1, was pleated with pleats spaced apart 13.1 mm, which were heat set, and constructed into a 150×65×40 mm gas phase personal protective filter with 104 g of activated carbon in the filter and a pressure drop of 47 Pa at 85 l/min air flow. Adsorption performance for the filter was measured as 38 minutes to 10% break-through when charged with 1000 ppm CCl$_4$ at an air flow of 64 l/min.

EXAMPLE 6

Two open webs were formed in accordance with Example 3. Thereafter, 30×50 mesh granular activated carbon and subsequently 30×50 mesh potassium permanganate-on-zeolite were added to the webs to achieve the desired fiber-to-particulate weight ratio, with a 60:40 activated carbon/potassium permanganate ratio. The web structure was agitated by means of a beater bar to promote generally uniform distribution of both particulates. Each particulate was added in a single application. Like process conditions as in Example 3, except as here specified, were used to achieve an improved degree of three-dimensional, generally equidistant spacing of particulate; however, in this case, the two types of particulate each form a generally uniform layer within the structure. Then, the particulate-loaded, microstructure was stabilized and a unitary multi-web structure was formed in like manner as Example 3, and thereafter pre-sized.

A like structure was formed in the same manner as the first one, and then the first half was applied up-side-down on top of the second, which was still sufficiently hot to form a vertically symmetrical structure, with an improved degree of general uniformity and of three dimensional, equidistant spacing of immobilized particulate within the macrostructure, and of unitary character, in accordance with the present invention. The potassium permanganate was disposed in the core of the structure, and the activated carbon was disposed relatively closer to the surface.

As a final step, the fibrous structure was heated in preparation for thermoforming and sized using a nip gap of 1.52 mm. The resulting macrostructure was 1.79 mm thick with a loading of 448 g/cm$^2$ activated carbon and potassium permanganate (equivalent volume is 1790 cm$^3$, which is equal to a specific loading of 0.28 g/cm$^3$ (the actual loading was normalized to 502 g based upon 0.5 g/cc apparent density). The media had an air permeability of 458 l/cm$^2$/hr at 200 Pa pressure drop, and good integrity and stiffness.

EXAMPLE 7

Two open webs were formed, activated carbon entrapped therein, and the multi-web structure pre-sized, as in Example 1. Then, a like structure was formed in the same manner as the first one, but in addition, an 11 g/m$^2$ melt-blown web of PBT fibers was included within the pre-formed, partially pre-bonded web. The first multi-web structure was applied on top of the second, which was still sufficiently hot to form a unitary fibrous structure, with an improved degree of general uniformity and of three-dimensional, equidistant spacing of immobilized particulate within the macrostructure, and of unitary character, in accordance with the present invention.

As a final step, the fibrous structure was heated in preparation for thermoforming and sized using a nip gap of 1.52 mm. The resulting media was 1.7 mm thick, had an air permeability of 120 l/cm$^2$/hr at 125 Pa pressure drop, and excellent integrity and stiffness. In addition to its excellent adsorption performance, the media provides >95% particulate removal efficiency for 3 μm particles @ 1.6 m/sec velocity in a typical 254×254×38 mm combination gas phase/particulate removal vehicle cabin air filter.

The present invention may be carried out with various modifications without departing from the spirit or essential attributes thereof, and accordingly, reference should be made to the appended claims, rather than to the foregoing specification as indicating the scope of the invention.

I claim:

1. A process for making a high performance, permeable, pleatable fibrous structure comprising a particle-loaded web structure having a specific loading of at least 0.25 g/cm$^3$ of functional particles, said process comprising
    (a) dry forming an open, generally uniform, fibrous web structure comprising crimped staple composite fibers comprising a heat-softenable, structural component and a lower melting component;
    (b) thereafter generally equidistantly spacing in three dimensions and entrapping in interstices of said open, generally uniform, fibrous web structure, a sufficient loading of functional particles of suitable physical characteristics;
    (c) thereafter heat-treating said fibrous web structure prior to any application of pressure thereto, at a first elevated temperature whereby said lower melting component of said composite fibers provides for fiber-fiber bonding at fiber cross-over points and for adhesion of said functional particles to said fibrous web structure so as to form a stabilized microstructure;
    (d) thereafter by an additional heat treatment step carried out without application of pressure to said fibrous web structure, heating the microstructure-stabilized fibrous web structure to a thermoforming temperature, said thermoforming temperature being elevated but less than said first elevated temperature, and
    (e) thereafter effecting macrostructural change by reducing in thickness said microstructure-stabilized web structure heated to said thermoforming temperature, and yet maintaining microstructural relative geometry whereby said web structure is increased in structural integrity and stiffened, and is of decreased volume so as to comprise said specific loading, and yet has an air permeability greater than 100 l/cm$^2$/hr at 200 Pa.

2. The process of claim 1, wherein said dry forming comprises carding.

3. The process of claim 1, wherein said fibrous web structure is formed on a fibrous support structure and said heat-treating at a first elevated temperature bonds said fibrous web structure to said fibrous support structure.

4. The process of claim 1, further comprising forming a stacked structure of fibrous web structures each comprising said functional particles, prior to carrying out the first heat-treating step.

5. The process of claim 1, wherein IR heat is used for said heat-treating at a first elevated temperature, and for said additional heat treatment step.

6. The process of claim 1, wherein reducing said web structure in thickness, comprises passing the heated web structure through a nip gap.

7. The process of claim 1, further comprising actively cooling the web structure to obtain the reduction in thickness.

8. the process of claim 1, further comprising, subsequent to reducing said web structure in thickness, pleating said fibrous structure and heat setting the pleated structured.

9. The process of claim 1, wherein said crimped fiber is three-dimensionally crimped fiber.

10. The process of claim 1, wherein said crimped fiber is macrofiber.

11. The process of claim 10, wherein said fibrous structure further comprises a microfiber web.

12. The process of claim 1, wherein said functional particles are loaded in an amount sufficient to provide a specific loading of about 0.30 to 0.35 g/cm$^3$ or more, and an air permeability of about 175 to 200 l/cm$^2$/hr or more at 200 Pa.

13. The process of claim 1, wherein said functional particles are sorptive particles.

14. The process of claim 1, wherein said functional particles are activated carbon particles.

* * * * *